Figure 1:
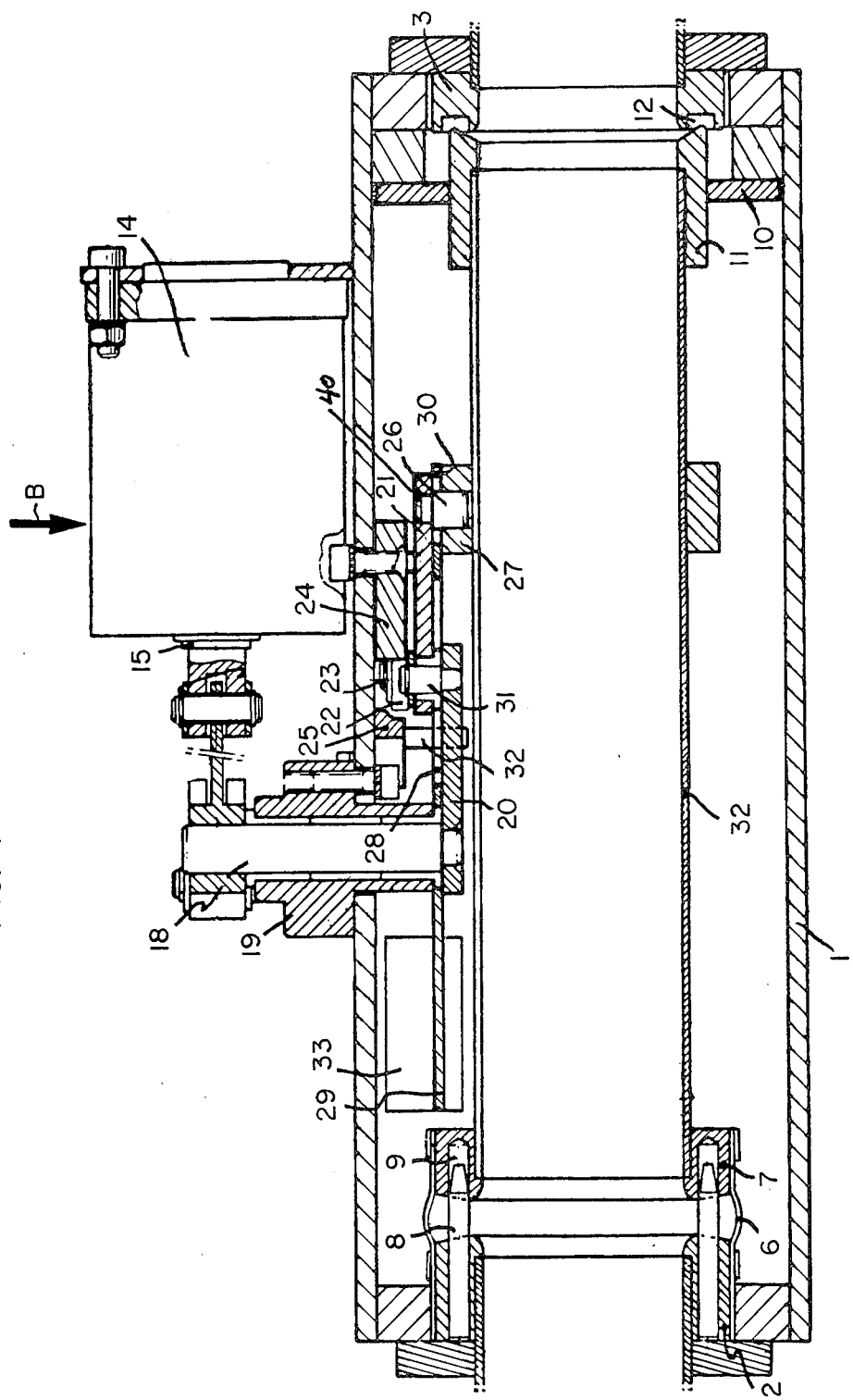

United States Patent [19]

Carlier

[11] 4,355,930
[45] Oct. 26, 1982

[54] CONTROL AND LOCKING OF PIVOTING NEEDLE FOR PNEUMATIC PIPE CARRIERS

[76] Inventor: Claude Carlier, 134, rue Saint Denis, 93100 Montreuil, France

[21] Appl. No.: 206,539

[22] PCT Filed: Nov. 7, 1979

[86] PCT No.: PCT/FR79/00100
§ 371 Date: Jul. 2, 1980
§ 102(e) Date: Jul. 2, 1980

[87] PCT Pub. No.: WO80/00954
PCT Pub. Date: May 15, 1980

[30] Foreign Application Priority Data
Nov. 8, 1978 [FR] France ............... 78 31521

[51] Int. Cl.³ .................................... B65G 51/24
[52] U.S. Cl. ............................................. 406/182
[58] Field of Search ............... 406/182; 137/874

[56] References Cited

U.S. PATENT DOCUMENTS

| 3,367,603 | 2/1968 | Feyerherd | 406/182 |
| 3,762,664 | 10/1973 | Loveless | 406/182 |
| 3,868,071 | 2/1975 | Weaver | 406/182 |
| 3,961,643 | 6/1976 | Lynch | 406/182 |

FOREIGN PATENT DOCUMENTS

| 2303296 | 8/1973 | Fed. Rep. of Germany | 137/874 |
| 1439434 | 4/1966 | France | 406/182 |
| 1068266 | 5/1967 | United Kingdom | 406/182 |
| 1417890 | 12/1975 | United Kingdom | 406/182 |

*Primary Examiner*—Jeffrey V. Nase
*Attorney, Agent, or Firm*—Kerkam, Stowell, Kondracki & Clarke

[57] ABSTRACT

The invention relates to a pivoting switch control mechanism for pneumatic conveyors. Transmission of the pivoting movement of the control arm (20) at its fulcrum on the movable switch (5) is effected by means of a return arm (21), articulated both on the control arm and on a stationary switch drive stop (26) which plays the role of fulcrum, said return arm further supporting a guide wheel (22) intended to follow the two inclined sides DC-CE of a single cam 24 mounted stationary upon a housing (1). The sealed switch installations are capable of operating for any direction of travel of the cartridges, by vacuum or pressure.

13 Claims, 6 Drawing Figures

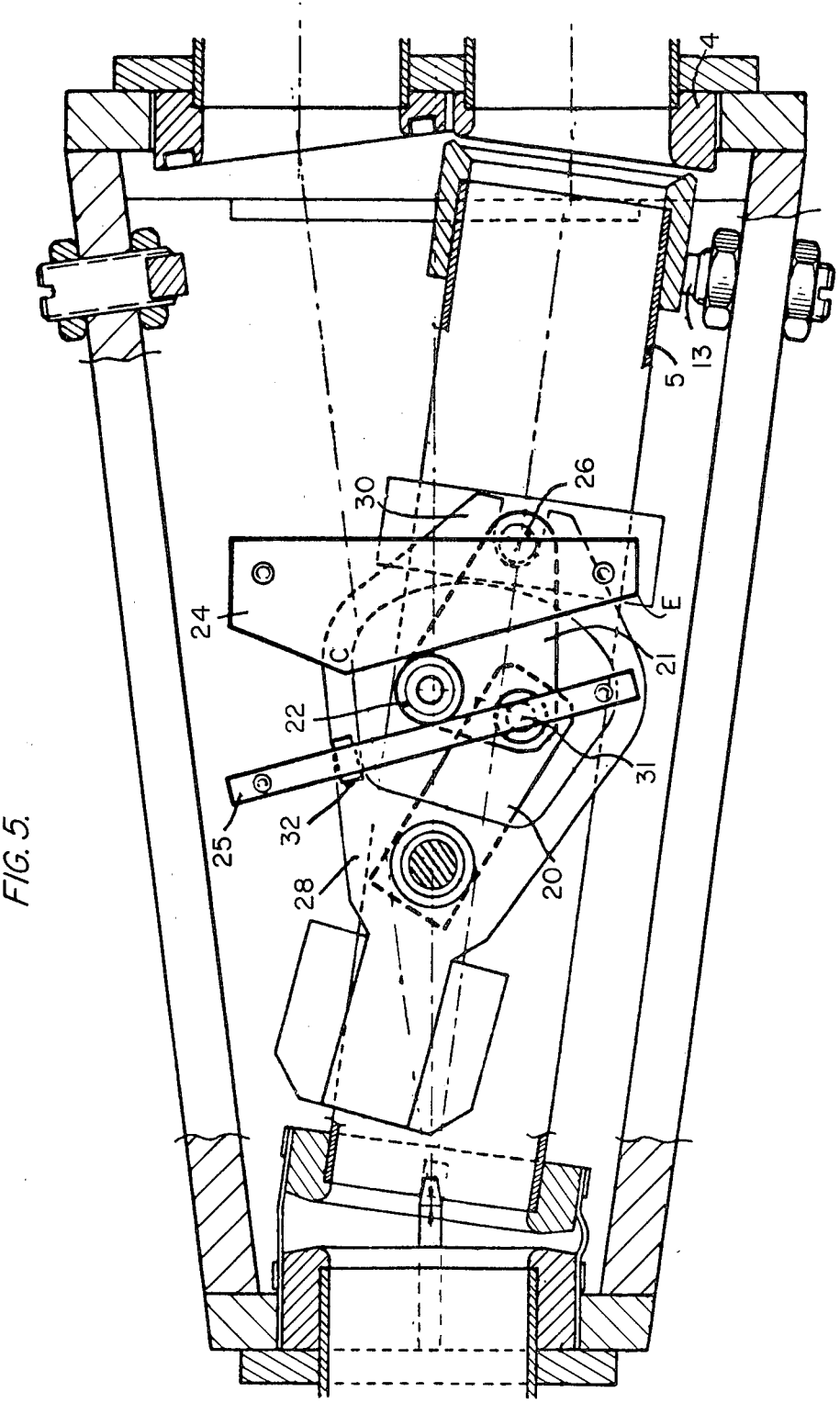

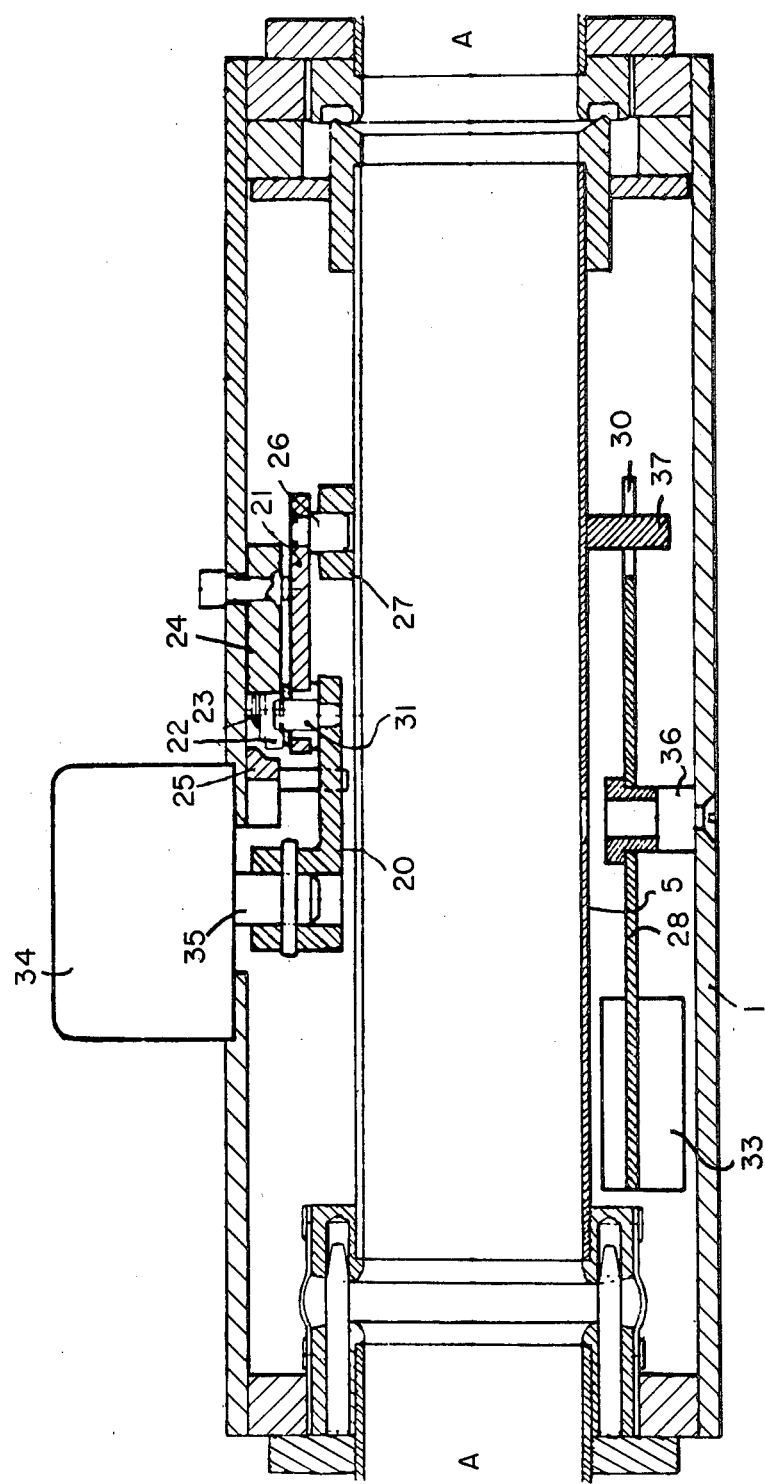

CONTROL AND LOCKING OF PIVOTING NEEDLE FOR PNEUMATIC PIPE CARRIERS

The invention concerns a system for control and locking of the pivoting switch of a pneumatic tube conveyor unit.

In a pneumatic tube conveyor, it is known that there exist a certain number of sending-receiving stations served by one or more lines, often connected to an automatic control center. In order to limit the cost of these installations, it is more and more common to use, to the extent possible, a single conveyor line to which are here and there connected shunt lines leading to a station. At the connection point, it is therefore necessary to have a switching mechanism which is in continuous sealed connection with the line sections it joins.

A sealed housing surrounds the tube inlets, inside of which are located the switching mechanisms themselves. However, there must also be a seal at least between the pivoting end of the switch and one of the lines.

Various mechanisms exist for carrying out the pivoting of the switch and its sealed locking against the end of a line, consisting of giving said switch, in addition to its lateral pivoting movement, an axial displacement permitting it to compress, at the end of its travel, an annular gasket mounted on the line so as to complete the seal, said axial displacement being made possible by a flexible coupling playing the role of pivot axis.

Compression of this gasket by the pivoting tube requires application onto the switch of a certain axial force and, consequently, a sturdy mechanism having a relatively high-powered control unit. Furthermore, in known systems, the system cannot be operated in all positions, due to the variable force of gravity on the movable switch according to the orientation of the switch assembly.

In order to improve the systems for controlling and locking pivoting switches, while at the same time eliminating the difficulties inherent in known constructions, the applicant has developed a new control and locking system which has the following advantages. First, the control mechanism requires only a low power motor, since the angle of pivot at the fulcrum of the control arm is small. Next, the system is able to operate in any position, whether the switch is horizontal, vertical, directed upward, downward, etc., and for any direction of travel of the cartridge. In addition, construction is simple, inexpensive, and reduced in size, thus enabling easy incorporation into the switch housing. Finally, by virtue of its disposition inside a sealed housing, the new system of the invention operates without any need to seal the shunt line.

According to an essential characteristic of the invention, transmission of the pivoting movement of the control arm, at its fulcrum on the movable switch, is effected by means of a return arm articulated both on the control arm and on a switch drive stop which plays the role of fulcrum, said return arm further having a guide wheel intended to track the two inclined sides of a single cam mounted stationary onto the frame.

According to one particular characteristic of the invention, there is provided a pivoting paddle turning about the control axis and projecting up to the switch drive stop, intended to compensate for the weight of the mechanisms and the switch under certain conditions of use.

Figure 2:
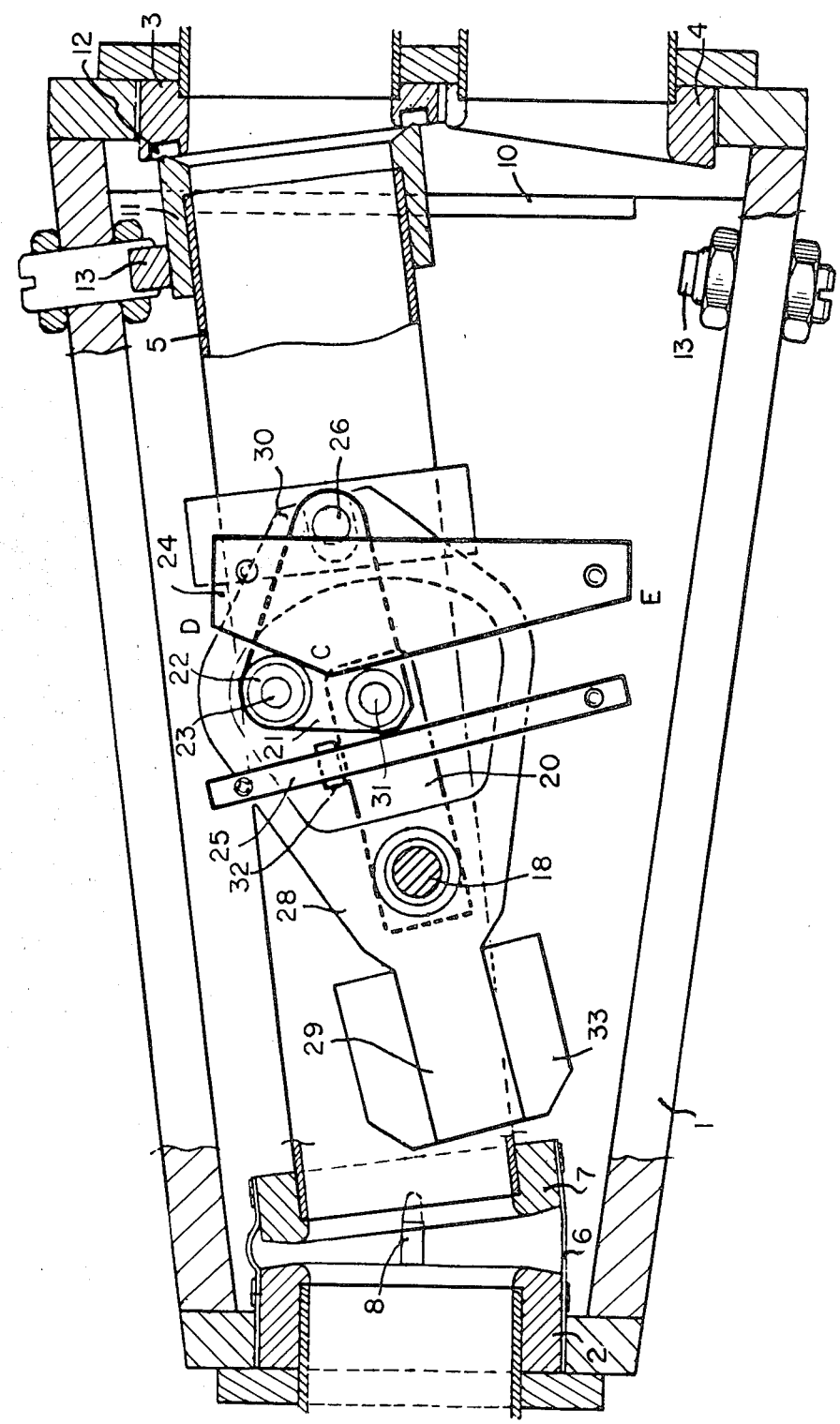
Figure 3:
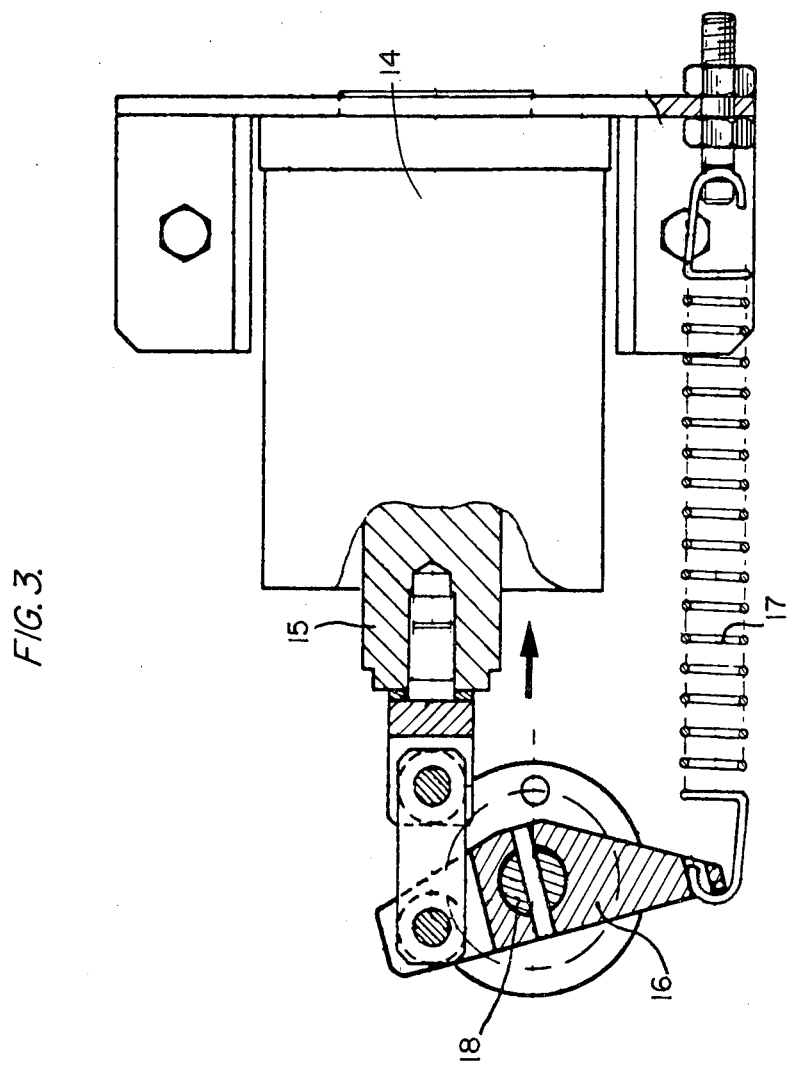
Figure 4:
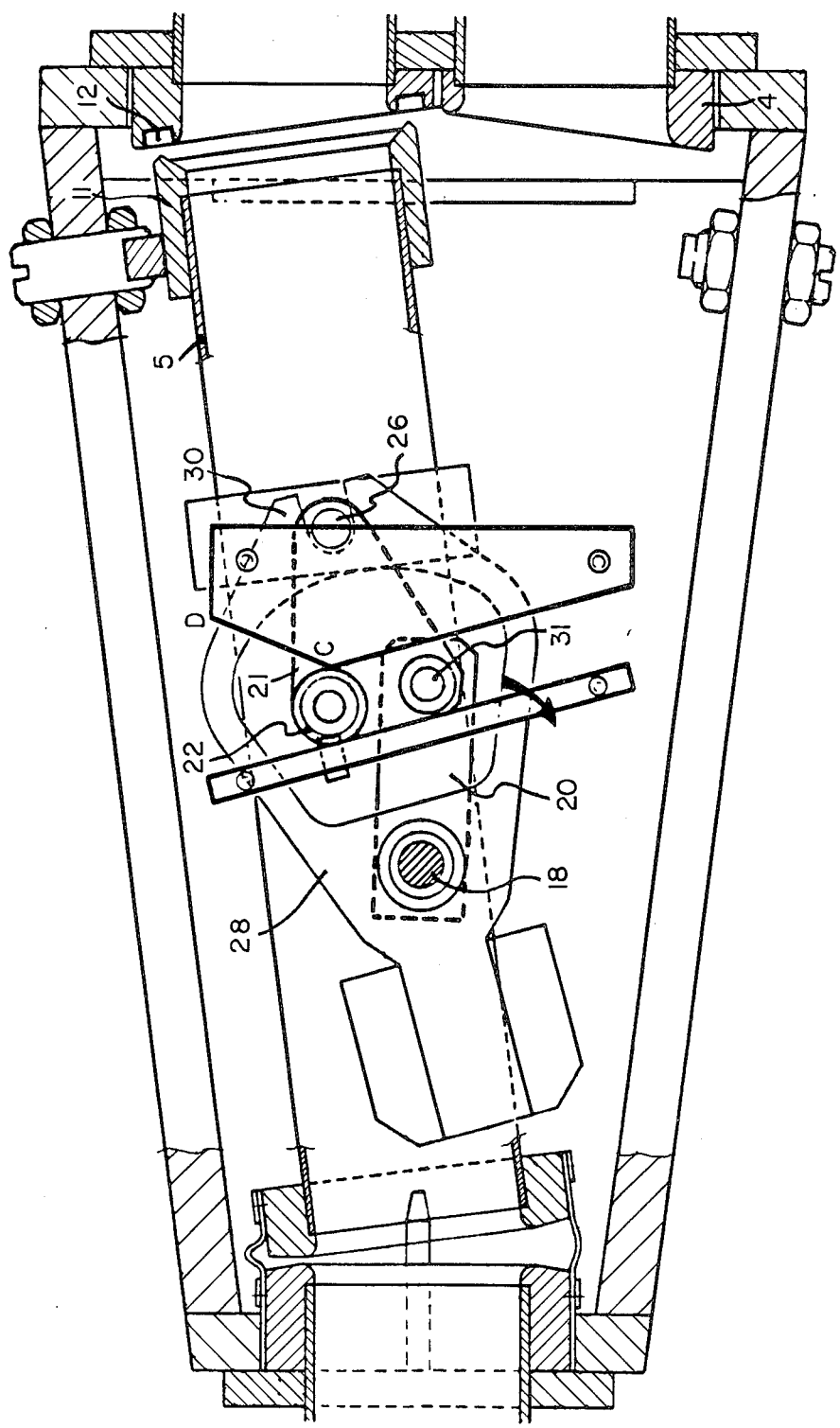

Other particular characteristics and advantages of the invention will emerge from the following description of one embodiment, with reference to the attached drawings, which represent:

FIG. 1: a partial vertical cross-section of the pivoting switch and its control mechanism;

FIG. 2: a cross-sectional view along line AA' of FIG. 1;

FIG. 3: a partial cross-sectional view along B of FIG. 1;

FIGS. 4 and 5: cross-sectional views analogous to FIG. 2, showing the pivoting switch in intermediate position and pivoted position;

FIG. 6: a partial vertical cross-section of the switch, according to one variant.

The switch represented, particularly in FIGS. 1 and 2, is contained within a sealed housing 1 which, on one side, receives a connection ferrule 2 on the main line and, on the other, a connection ferrule 3 on the opposite section of the main line, as well as another shunt ferrule 4, connected, for example, to a transmitting and receiving station in the network. Movable tube 5 of the switch is intended to connect ferrule 2 to one or the other of ferrules 3 and 4 by pivoting about an axis which is perpendicular to the axis of the main line at the level of ferrule 2. Articulation of the pivoting switch at the ferrule is sealed by a flexible coupling 6 fastened both to ferrule 2 and crown 7, which is integral with switch 5. In addition, two diametrically opposed guide pins 8 provided on ferrule 2 penetrate into corresponding holes 9 of crown 7. They permit switch 5 to pivot within the plane of FIG. 2 and enable a certain axial displacement of switch 5 during its pitoving motion, as will emerge further on.

On the side opposite ferrule 2, switch 5 moves in guides 10 fastened to housing 1 and is equipped with a hollow sleeve 11, the projecting portion of which, having a truncated cross-section, is applied against flexible annular gasket 12 mounted in a channel provided on the face oriented toward the inside of the housing of connection ferrule 3 of the main line, as shown in FIG. 2. The lateral pivot of switch 5 is limited by stationary stops 13 which are also integral with housing 1.

Control of the pivoting and locking of switch 5 is assured by an electro-magnet 14 mounted above the housing. It can be seen in FIGS. 1 and 3 that movable core 15 of electro-magnet 14 is attracted in the direction of the arrow, causing lever 16 to pivot, against the return force of spring 17. Lever 16 is integral with an axis 18 which pivots within guide shaft 19 mounted on the housing, the end of which projects into sealed housing 1. To the lower end of the axis is welded a control arm 20 which extends inside the housing above pivoting switch 5. Along an axis 31, perpendicular to the control arm at its extremity, turns a triangular return arm 21 which also extends inside the housing above the pivoting switch. Said return arm 21, which is articulated at the end of the control arm, further carries a guide wheel 22 having a verticle axis, mounted above the return arm on pivot 23. Said wheel 22 comes into lateral contact with a flat cam 24, fastened onto the inside of housing 1 above the return arm. Cam 24 has two inclined sides CD-CE proceeding from a bending point C which is essentially disposed within the axis of connection of ferrules 2 and 3. Another guide gradient 25 is also fastened to the inside of housing 1, parallel to side CE of cam 24, at a distance which is slightly greater than the diameter of wheel 22. The track thus formed between gradient 25 and side CE of cam 24 serves to guide wheel 22 during the pivoting motion of switch 5. The opposite end of return arm 21 carries a stud 26 in openig 40 which engages within a work shaft 27 which is integral with shaft 5. Said stud 26 thus constitutes the fulcrum on the movable switch of the pivot control mechanism consisting of control arm 20 and return arm 21. According to a non-represented variant, the opposite end of return arm 21 is equipped with a ring or opening into which is engaged a stud attached to switch 5. In the two preceding cases, the switch-return arm connection is completely analogous.

Furthermore, a small vertical stop 32, attached under gradient 25, limits the lateral displacement of control arm 20. In addition, on axis 18, above control arm 20, turns a pivoting paddle 28 which plays the role of counter-weight, one end 29 of which (the side of coupling 2) bears a weight 33, while the opposite end has a fork-shaped section 30 which surrounds stud 26. It will be noted in FIG. 1 that said fork encloses stud 26 below return arm 21. The center part of paddle 28, as seen in FIG. 2, is largely hollowed-out so as not to impede the movement of axis 31, forming the articulation of return arm 21 on control arm 20. The paddle thus mounted pivots about axis 18, following the movement of stud 26, and thus of switch 5, which drives said paddle by the edges of fork 30.

The switch operates in the following manner. FIG. 2 shows switch 5 in so-called "rest" position, in which a sealed connection between the two opposite sections of the main line is made. In this case, with electro-magnet 14 not excited, the return force of spring 17 (FIG. 3) is exerted on the end of lever 16 so as to maintain axis 18 and control arm 20 in the position of FIG. 2. With switch 5 applied against stop 13, control arm 20 is also applied against stop 32. Consequently, the fulcrum formed by stud 26 is aligned with control arm 20. The three aligned points: axis 18, axis 31, stud 26, represent the maximum possible distance between axis 18 and stud 26, i.e., control arm 20 and return arm 21 exert a force on stud 26 in the direction of axial maintenance of switch 5 in locked position, in which sleeve 11 compresses annular gasket 12 and makes the seal between pivoting switch 5 and ferrule 3. It will be noted that stud 26 blocked laterally since switch 5 is in contact with stop 13 and control arm 20 is also blocked laterally by stop 32. Wheel 22 thus occupies the position represented, in contact with side CD of cam 24.

When switch 5 has to pivot into alternate position facing ferrule 4, end sleeve 11 must first be disengaged axially from annular gasket 12, prior to the actual pivoting motion.

This initial step is illustrated in FIG. 4. Upon excitation of electro-magnet 14, the attraction of movable core 15 against the force of spring 17 (FIG. 3) initiates the pivoting motion of axis 18 and control arm 20 in the direction indicated by the arrow. In the pivoting motion, axis 31 drives return arm 21, of which wheel 22 follows inclined side DE of cam 24. Since stud 26 is therefore no longer aligned with control arm 20 (broken line 18-31-26), it is necessarily closer to axis 18. Consequently, when wheel 22 has essentially reached point C, return arm 21, by pivoting, has induced the withdrawal of switch 5 by several millimeters in the direction of the articulation of switch 5, i.e., the end of the latter has cleared annular gasket 12 by an equal distance. The switch may then pivot. Paddle 28 follows the motion of stud 26 thanks to fork 30, and its counterweight thus balances the moving mass as indicated below.

The second pivot phase is illustrated in FIG. 5. Starting from the position indicated above (wheel 22 at point C), the pivoting movement of control arm 20 continues. At the end of control arm 20, axis 31, on which turns return arm 21, effects a circular movement, as indicated. Wheel 22, on the other hand, is guided in the track defined by gradient 25 and side CE of cam 24. The combination of the pivoting movement of axis 31 and the rectilinear displacement of wheel 22 assures the translation and simultaneous pivoting of return arm 21, which is manifested in a displacement of stud 26, and therefore of switch 5, until the latter comes into contact with stop 13. The switch is now positioned facing ferrule 4 and is ready to effect the passage of a cartridge coming from or going to a shunt line. Switch 5 is not yet sealed against ferrule 4 at this point. The passage of air between ferrule 4 and the inside of the housing has no effect on the operation of the unit. This diverted position of the switch is called the working position, which corresponds to the excitation of the electro-magnet. As soon as the latter is interrupted, the switch returns to its position by reverse motion under the force of spring 17, which causes the return of control arm 20 to stop 32. In the course of these displacements of switch 5, pivoting paddle 28, fork 30 of which is permanently engaged around stud 26, follows the pivoting motion of the switch. It was seen that its end 29 carried a counterweight 33. The function of the paddle is to compensate for the weight of the switch and its related control mechanisms in all possible operating positions of the switch.

If the switch operates flat in the plane of FIG. 2, the horizontal displacement of switch 5 along guides 10 is accomplished without difficulty by the electro-magnet or its return spring. Here pivoting paddle 28 plays no role at all. If, on the other hand, the switch operates in a vertical plane, neither the force of the electromagnet nor of the return spring will be sufficient to displace the control arm, return arm and switch from a low position to a high position. Paddle 28 and its counter-weight 33, which pivots about horizontal axis 18 and holds pivoting switch 5 by stud 26, equilibrates the moving masses at axis 18. This complementary balancing system, joined with the switch control and locking mechanisms, is extremely advantageous since it enables installation of the switch in any position, for any direction of travel of the cartridge, whether moved by pressure or vacuum. The pivoting switch is thus very flexible in use and lends itself to all installations.

FIG. 6 shows variants of the invention. A first represented variant consists of disposing a rotary electromagnet 34 in place of the classic electromagnet shown in FIGS. 1 and 3. This rotary magnet is placed directly on the housing and its axis 35 is substituted for axis 18 in the other embodiments. Control arm 20 is keyed onto axis 35. This rotary magnet possesses its own return spring. It thus eliminates the mounting of the pivoting lever (FIG. 3) and releated elements and thereby represents an interesting improvement from the point of view of simplification and cost. Since, by construction, the travel of control arm 20 is short, a low-power rotary magnet having a short travel can easily be adapted.

The second variant shown consists of mounting pivoting paddle 28 not above the switch, i.e., on axis 18 of control arm 20, but on the other side of switch 5. The paddle is here mounted on a pivot 36 fastened to the inside of housing 1. On the side opposite counter-weight 33, its fork-shaped end 30 encloses a stud 37 analogous to stud 26, fastened to the lower part of the switch. The paddle balances the moving masses in the same way. Its particular position on the side opposite the mechanisms makes the manufacture of the switch easier, and enables more space to be made available in the upper area for actual locking and control mechanisms.

The invention is of course not limited to the preceding examples of particular example embodiments but rather encompasses all constructive variants.

I claim:

1. Switch for pneumatic tube conveyor comprising, within a sealed housing, a pivoting switch joining one section of main line at the side of its axis of pivot to a second section of main line or to a section of shunt line at the opposite side, said switch being sealed against a second section of main line by a slight axial displacement of the switch in the direction of compression of an annular gasket disposed at an end of said second section, and the transmission of motion between a drive mechanism and a fulcrum integral with the pivoting switch being carried out by a pivoting control arm acting upon a substantially triangular return arm, one angle of which catches said fulcrum, the return arm (21) pivots about an axis (31) carried on the end of the control arm (20), on which it turns along another of its angles and thus follows totally the pivoting motion of said control arm, and that it carries, in the area of its third angle, a guide wheel (22), applied against at least one stationary cam (24) serving to orient said return arm during the pivoting of the control arm.

2. Switch according to claim 1, the pivoting control arm (20) disposed inside the housing above the pivot plane of switch (5) is fastened to an axis of rotation (18) passing through the housing and worked by a driving electromagnet (14) having a short travel.

3. Switch according to claim 2, the driving electromagnet is a rotary electromagnet, the axis of which is combined with axis (18) of control arm (20).

4. Switch according to claim 1, the fulcrum of the return arm (21) on the pivoting switch (5) is a stud (26) fastened in proximity to another angle of the return arm and entering a work shaft (27) attached to the switch.

5. Switch according to claim 1, the fulcrum of the return arm (21) on the pivoting switch (5) in an opening (40) provided in proximity to another angle of the return arm, into which penetrates a stud (26) attached to the switch.

6. Switch according to claim 1, the wheel (22) is mounted on pivot (23) located in proximity to the third angle of the return arm (21), on a level distinct from that of said return arm.

7. Switch according to claim 1, the cam (24) fastened to the inside of the switch housing (1) has a vertical surface at the level of the wheel (22), having two inclined sides CD and CE proceeding from a bending point C which is substantially disposed within the axis of connection of the main line sections.

8. Switch according to claim 7, a guide gradient (25) is also affixed to the inside of the housing (1) parallel to side CE of the cam (24) at a distance slightly greater than the diameter of the wheel (22).

9. Switch according to claim 8, a stop (32) fastened onto the gradient (25) limits the lateral displacement of the control arm.

10. Switch according to claim 1, a counterweight device, intended to compensate for the weight of the drive mechanism and the switch under certain conditions of installation of the switch, is mounted so as to pivot and is worked by the switch.

11. Switch according to claim 10, that the counterweight device consists of a pivoting paddle (28) supporting a weight (33), turning about the axis (18) of the control arm (20) and projecting up to the switch drive stud (26).

12. Switch according to claim 11, the end of the blade has a fork-shaped cross-section (30) in order to enclose the stud below the return arm (21).

13. Switch according to claim 10, the counterweight device consists of a pivoting paddle (28) supporting a weight (33), turning on a pivot (36) fastened to the inside of the housing (1) and projecting up to a stud (37) integral with the switch.

* * * * *

UNITED STATES PATENT AND TRADEMARK OFFICE
CERTIFICATE OF CORRECTION

PATENT NO. : 4,355,930
DATED : October 26, 1982
INVENTOR(S) : Claude CARLIER

It is certified that error appears in the above-identified patent and that said Letters Patent is hereby corrected as shown below:

IN THE CLAIMS:

Claim 5, line 2, after "(5)", "in" should be -- is --;

Claim 11, "that" (line 1) should be deleted

Signed and Sealed this

Twenty-first Day of December 1982

[SEAL]

Attest:

GERALD J. MOSSINGHOFF

Attesting Officer

Commissioner of Patents and Trademarks